(12) United States Patent
Barker

(10) Patent No.: US 6,373,235 B1
(45) Date of Patent: Apr. 16, 2002

(54) APPARATUS AND METHOD FOR DETERMINING THE POSITION AND MOTION OF AN OBJECT AND FOR PRECISE MEASUREMENT OF PHASE-RELATED VALUES

(76) Inventor: Clifford A. Barker, 120 S. Delaware Pl., Tulsa, OK (US) 74104

( * ) Notice: Subject to any disclaimer, the term of this patent is extended or adjusted under 35 U.S.C. 154(b) by 0 days.

(21) Appl. No.: 09/563,295

(22) Filed: May 3, 2000

Related U.S. Application Data

(60) Provisional application No. 60/132,424, filed on May 4, 1999.

(51) Int. Cl.[7] .............................................. G01R 23/12
(52) U.S. Cl. ...................... 324/76.53; 324/716; 324/683; 331/1 A; 331/2; 331/4; 331/16; 331/25; 331/33
(58) Field of Search ............................... 324/76.53, 683, 324/716; 331/1 A, 4, 33, 16, 25, 2; 345/856

(56) References Cited

U.S. PATENT DOCUMENTS

| | | | |
|---|---|---|---|
| 3,319,178 A | * 5/1967 | Broadhead, Jr. ................. 331/1 |
| 3,370,251 A | * 2/1968 | Overstreet, Jr. ............... 331/55 |
| 3,611,175 A | * 10/1971 | Boelke ........................... 331/4 |
| 3,805,181 A | * 4/1974 | Charbonnier ................. 345/158 |
| 3,931,585 A | * 1/1976 | Barker et al. ................. 331/1 A |
| 4,070,634 A | * 1/1978 | Barker et al. ................... 331/2 |
| 4,071,691 A | 1/1978 | Pepper, Jr. ..................... 178/19 |
| 4,088,904 A | 5/1978 | Green .......................... 307/308 |
| 4,103,252 A | 7/1978 | Bobick ......................... 331/48 |
| 4,323,829 A | 4/1982 | Witney et al. ................. 318/55 |
| 4,680,429 A | 7/1987 | Murdock et al. ............... 178/19 |
| 4,698,461 A | 10/1987 | Meadows et al. .............. 178/19 |
| 4,806,709 A | 2/1989 | Evans ............................ 178/19 |
| 4,808,979 A | * 2/1989 | DeHoff et al. ............... 345/856 |
| 4,903,012 A | 2/1990 | Ohuchi ........................ 340/709 |
| 4,922,061 A | 5/1990 | Meadows et al. .............. 178/19 |
| 4,980,519 A | 12/1990 | Mathews ....................... 178/19 |
| 5,059,959 A | 10/1991 | Barry ........................... 340/709 |
| 5,101,197 A | 3/1992 | Hix et al. ..................... 340/784 |
| 5,166,679 A | 11/1992 | Vranish et al. ......... 340/870.37 |
| 5,168,531 A | 12/1992 | Sigel ............................. 382/48 |
| 5,214,388 A | * 5/1993 | Vranish et al. .............. 324/683 |
| 5,247,261 A | 9/1993 | Gershenfeld ................. 324/716 |
| 5,319,387 A | 6/1994 | Yoshikawa ................... 345/179 |
| 5,325,133 A | 6/1994 | Adachi ......................... 351/209 |
| 5,339,095 A | 8/1994 | Redford ....................... 345/158 |
| 5,394,183 A | 2/1995 | Hyslop ........................... 348/88 |
| 5,448,261 A | * 9/1995 | Koike et al. ................. 345/158 |
| 5,453,758 A | * 9/1995 | Sato ............................... 331/1 |
| 5,457,289 A | 10/1995 | Huang et al. .................. 178/20 |
| 5,463,388 A | * 10/1995 | Boie et al. ..................... 341/33 |
| 5,469,194 A | 11/1995 | Clark et al. .................. 345/173 |
| 5,502,459 A | 3/1996 | Marshall et al. ............. 345/158 |
| 5,790,602 A | * 8/1998 | Stephens ..................... 375/326 |

* cited by examiner

Primary Examiner—Glenn W. Brown
Assistant Examiner—Wasseem Hamdan
(74) Attorney, Agent, or Firm—Miles & Stockbridge P.C.

(57) ABSTRACT

In one embodiment, a high-resolution measurement apparatus and method determine the position and motion of an object such as a human hand relative to a sensor array. Capacitance transferred to the array by the object within a sensor field produces minute phase changes in a fixed-frequency reference signal applied to the several elements of the array. The phase changes are measured by first heterodyning the phase-shifted reference signal with a second reference signal to obtain a low frequency intermediate signal, and then employing a phaselocked loop to multiply the phase information in the intermediate signal by orders of magnitude, thereby permitting the use of conventional methods to measure the resulting greatly magnified phase changes. Other embodiments provide direct digital measurement of unknown electrical properties, such as capacitance, inductance, and resistance. In general, principles of the invention may be used to provide precise measurement of phenomena, properties, or conditions that produce phase shifts in a fixed-frequency reference signal.

25 Claims, 18 Drawing Sheets

APPARATUS AND METHOD FOR DETERMINING THE POSITION AND MOTION OF AN OBJECT AND FOR PRECISE MEASUREMENT OF PHASE-RELATED VALUES

CROSS-REFERENCE TO RELATED APPLICATION

This application takes the benefit of provisional application No. 60/132,424 filed May 4, 1999, incorporated herein by reference.

FIELD OF THE INVENTION

The present invention is concerned with precise measurement of physical phenomena, properties or conditions, such as values of capacitance, inductance, or resistance, for example, and is more particularly concerned with apparatus and methods for determining position and movement of a hand or other object in a sensor field.

BACKGROUND

Douglas Engelbart's invention of the mouse, patented in 1970, and the parallel development of the graphical user interface, made it possible for persons unfamiliar with computers to quickly become comfortable with their use. These two developments have contributed greatly to the explosive growth of the personal computer industry. More recently, along with hypertext, these innovations have fostered the dynamic growth of the Internet.

Numerous other devices now exist which generally duplicate the functions performed by the mouse and its buttons. These include the touchpad, used to integrate mouse functions into laptop and notebook computers; the joystick and other input devices used primarily with video games; and touchscreen and pen-based techniques which allow direct physical interaction between a user and the objects displayed on a computer monitor screen. All of these are variants of the basic mouse concept; hence, none represents a major breakthrough in human-computer input technology. Meanwhile, three dimensional computer representations are becoming increasingly commonplace in computer-aided design, games, virtual reality and autostereoscopic (i.e., 3D without glasses) displays. Existing two-dimensional input devices are inadequate to function as a natural, user-friendly complement to these three-dimensional output systems.

Existing two-dimensional input devices are tactile, requiring physical contact and manipulation by the user. The mouse, for example, is subject to failures from wear, jamming from foreign materials, and slipping on smooth surfaces. Other mouse-like devices, due to their tactile nature, suffer similar problems from repeated use and physical abuse.

In many types of computer use, the user constantly moves back and forth between the keyboard and the mouse or touchpad. These actions waste motion, are time consuming and often result in keystroke errors when the user's hand returns to the keyboard.

More recently, three-dimensional computer input techniques have been proposed, using video cameras or an arrangement of active devices, including sonic, radio frequency or infra-red emitters and detectors. Such techniques are costly, complex and usually intrude on the user's freedom of movement.

BRIEF SUMMARY OF THE INVENTION

The present invention provides high-precision apparatus, systems, and methods that employ phase shifts in a fixed-frequency signal. For example, the invention can be used to determine the position and motion of a hand or other object in a sensor field using one or more conducting elements or probes. It can also be used, for example, in precise measurement of electrical properties, such as capacitance, inductance, or resistance. In its application to the measurement of the position and motion of a hand or other object, human body capacitance[1] is transferred to the apparatus by the presence of a hand or other object near a probe or probe array. A multi-dimensional computer input is achieved by means of an array or network of two or more probes. In a preferred embodiment, probes are arranged in opposing pairs to achieve improved sensitivity and to cancel sensor nonlinearity.

[1] See "Human Body Capacitance: A Review" by Albert E. Seaver, Proceedings of the 25th Annual Meeting, Electrostatics Society of America, pp. 16–29, 1997.

In a preferred embodiment for the measurement of a hand or other object in a sensor field, a fixed-frequency signal is applied to a sensor network comprising one or more pairs of conducting elements connected to one or more passive components such as fixed resistors and/or inductors. Sensed capacitance changes result in phase changes in the applied signal relative to a reference signal. A novel method of phase measurement measures these phase changes with extremely high resolution and accuracy, producing an output that is inherently digital (i.e., incremental), and that can be readily converted into any desired computer input format.

Probe geometry can be varied to meet an unlimited number of specific applications. For example, multiple independent arrays can be employed to achieve a six-degree-of-freedom control input by using each hand to control a separate three-axis array, or by two persons competing simultaneously in the same 3D video game. Multiple planar arrays can be used to sense the proximity or actual location of a person or object for safety or intrusion detection purposes.

The present invention provides, inter alia:

1) A novel apparatus and method of measuring minute capacitance values with extreme precision, thereby to produce computer inputs representing the position and motion of a hand or other object in three dimensions, 2) A computer input device with no moving parts, which can be operated without physical contact, and is therefore inherently more reliable than existing tactile and force-feedback input devices, 3) A computer input device that permits a person using both a keyboard and the present invention to alternate between the two without moving their hands away from the immediate vicinity of the keyboard, thereby reducing fatigue and increasing the user's speed and accuracy, 4) A computer input device whereby human gestures can be compared to stored profiles that represent commands or data inputs to a computer or control system, 5) A low-cost computer input device, 6) A completely non-intrusive computer input device, 7) A computer input device which, in one embodiment, can be plugged into the mouse port of a desktop computer, obtaining its operating power directly from the host computer.

8) Apparatus and methods for precise measurement of unknown electrical properties, such as capacitance, inductance, and resistance.

9) Apparatus and methods for precise measurement of phenomena, properties or conditions that produce minute phase shifts in a fixed-frequency signal.

BRIEF DESCRIPTION OF THE DRAWINGS

The invention will be further described in conjunction with the accompanying drawings, which illustrate preferred and exemplary embodiments, and wherein.

DETAILED DESCRIPTION OF PREFERRED EMBODIMENTS

Figure 1:
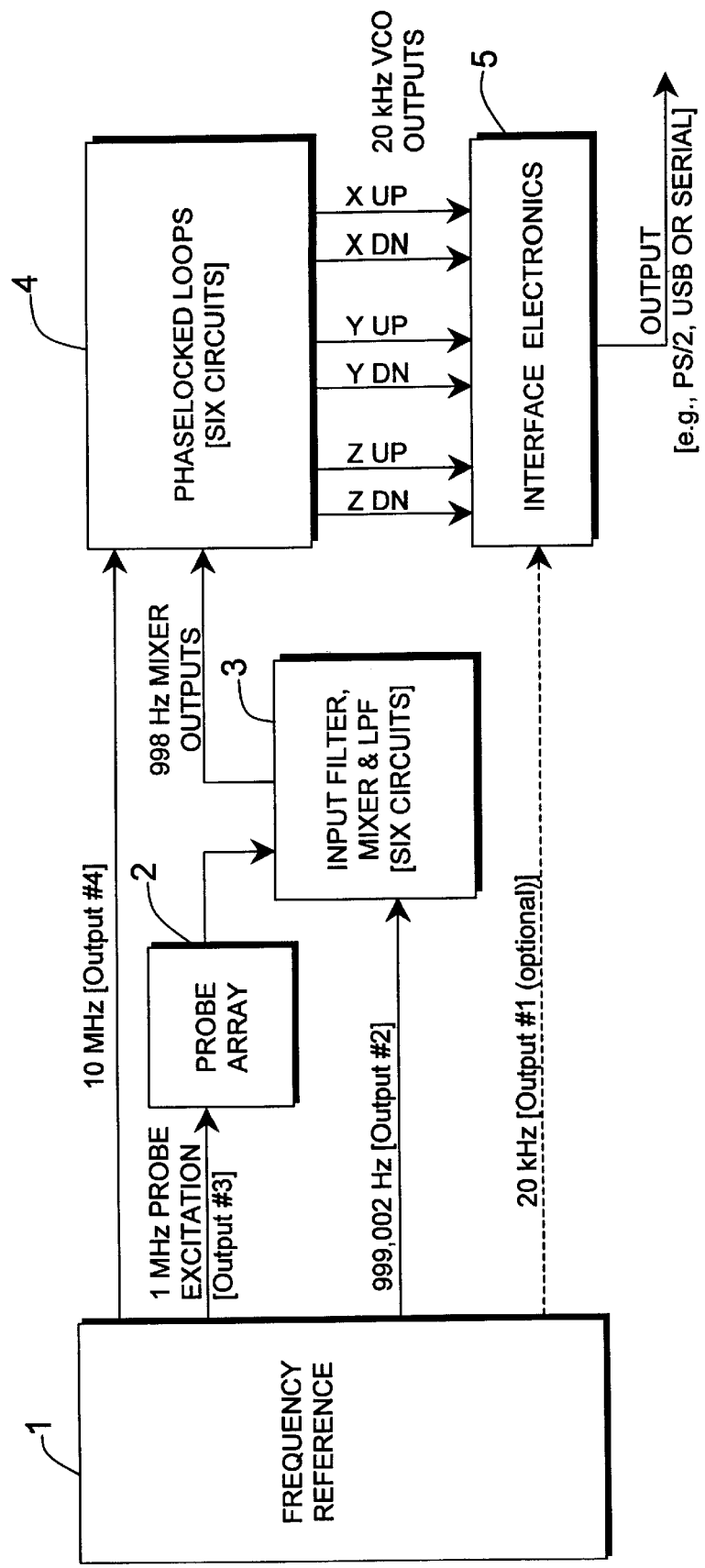
FIG. 1 is a block diagram of an apparatus for determining the position and motion of a hand in space in accordance with the invention.

FIG. 1 is a block diagram of one embodiment of the invention. Five separate blocks are shown to facilitate the following description. In the physical implementation, logic functions performed within each of the five blocks are preferably combined in a single programmable logic device such as a field-programmable gate array (FPGA), application-specific integrated circuit (ASIC) or the like.

Figure 2:
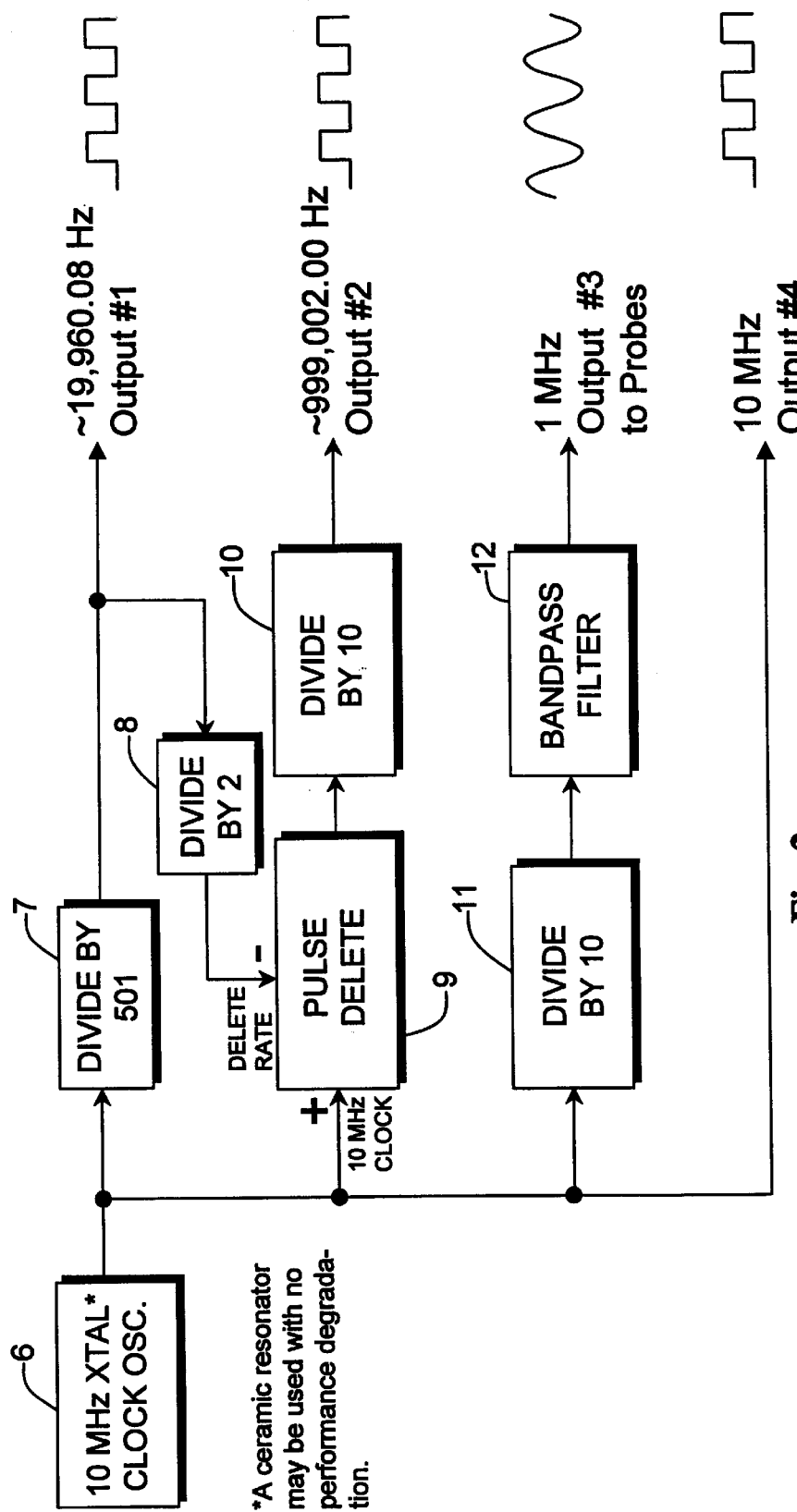
FIG. 2 is a detailed block diagram of a FREQUENCY REFERENCE shown in FIG. 1.

FIG. 2 is a detailed block diagram of Block 1, Frequency Reference, in FIG. 1. The square-wave output of a 10 MHz oscillator 6 is used to synthesize three derivative signals, which, together with the clock signal, comprise the four outputs of the Frequency Reference. These signals are used to implement the functions performed by the other blocks shown in FIG. 1.

The 10 MHz clock oscillator 6 is a widely available commercial device. Its output is applied to a divide-by-501 circuit 7 of conventional design to produce Output #1 of approximately 19,960.08 Hz.

The 19,960.08 Hz signal is also applied to a divide-by-two circuit 8 to produce a signal at approximately 9,980.04 Hz. This signal is then applied to the Pulse Delete circuit 9 to delete pulses from the 10 MHz clock signal.

Figure 3:
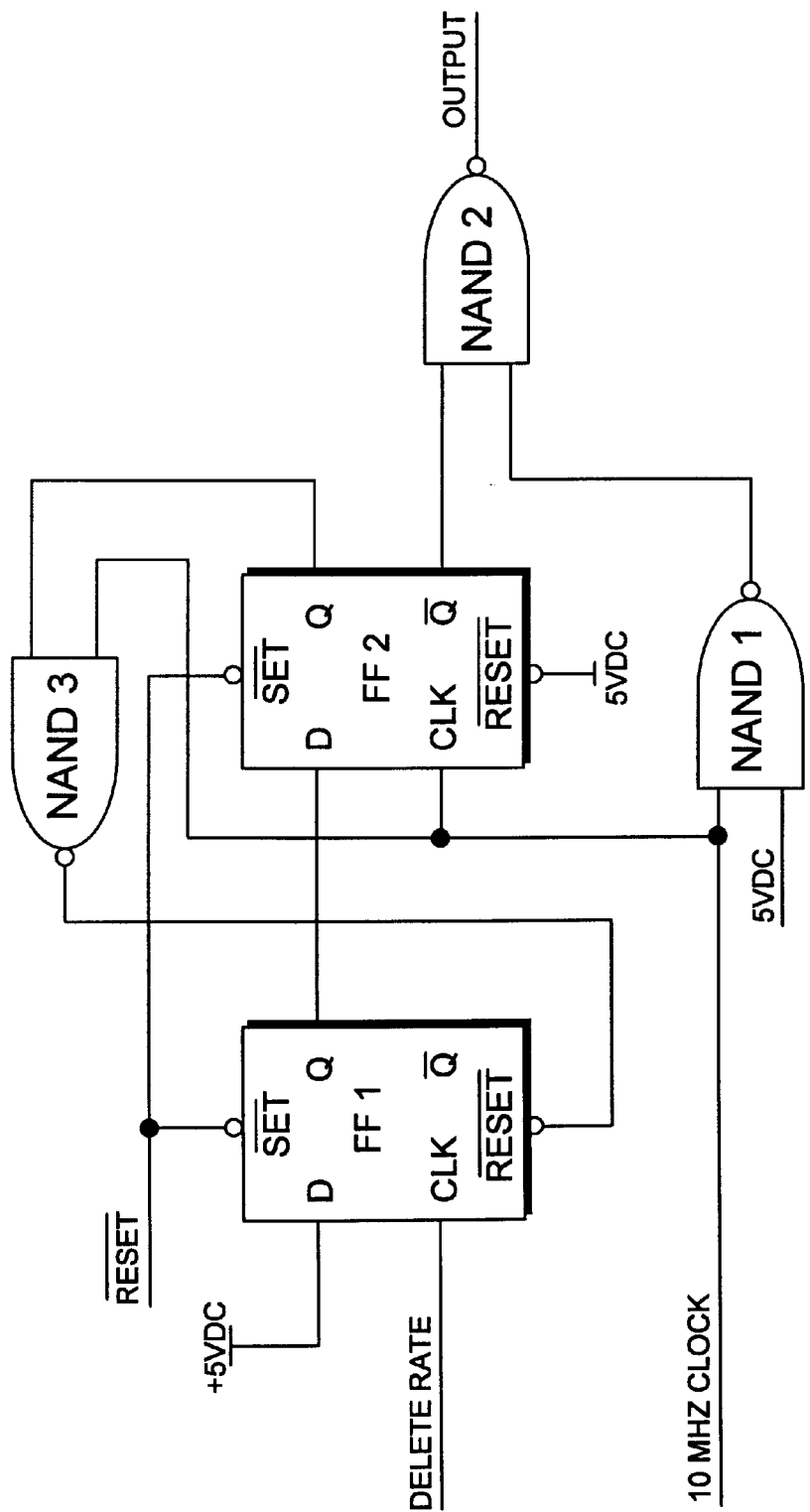
FIG. 3 is a schematic diagram of a PULSE DELETE shown in FIG. 2, in FIG. 9 and FIG. 18.

FIG. 3 is a schematic diagram of the Pulse Delete circuit 9. The circuit removes exactly one pulse from the 10 MHz Clock signal for each negative-to-positive transition of the Delete Rate (9,980.04 Hz) signal. After each pulse delete occurs, the input D flip-flop (FF 1) is reset via NAND 3 to wait for the next positive transition of the Delete Rate signal.

The resulting pulse train is then applied to a divide-by-10 circuit 10 (FIG. 2) of conventional design. The Output #2 is a signal at approximately 999,002 Hz ([10,000,000–9,980.04]/10). This signal exhibits phase jitter of ±18 degrees at 9,980 Hz, introduced by the pulse-delete-and-divide process.

Figure 4:
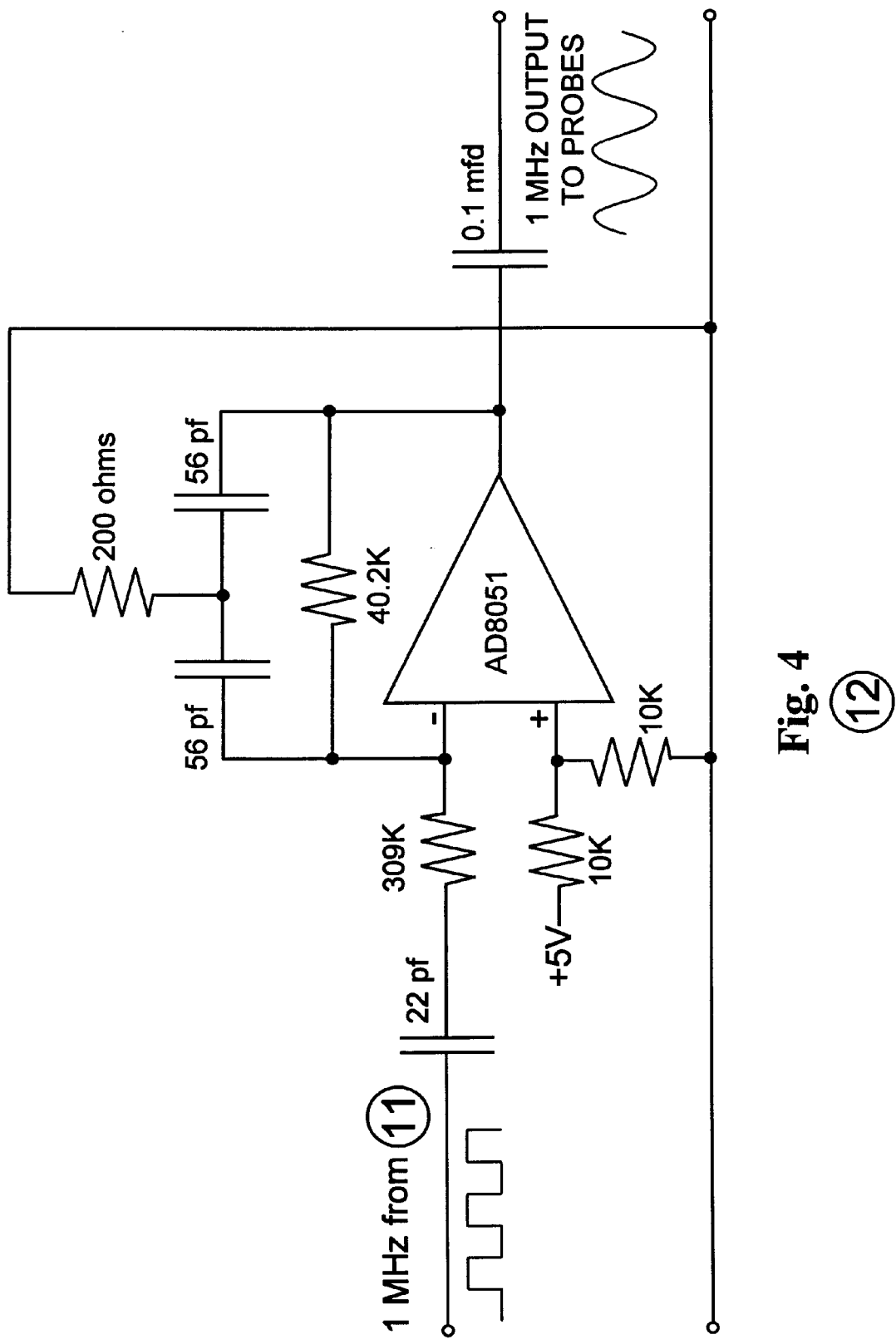
FIG. 4 is a schematic diagram of a BANDPASS FILTER shown in FIG. 2.

The 10 MHz clock signal is also applied to a divide-by-10 circuit 11, the 1 MHz square wave output of which is applied to a bandpass filter 12 as indicated in FIG. 2. FIG. 4 is a schematic diagram of a typical filter of this type. The filter output (Output #3 in FIG. 2) is a 1 MHz sine wave, which provides the excitation signal applied to each element of the Probe Array (Block 2 of FIG. 1). The 10 MHz clock, designated Output #4 in FIG. 2, is used to perform certain functions within the phaselocked loops (Block 4 of FIG. 1), as will be described in detail below.

Figure 5:
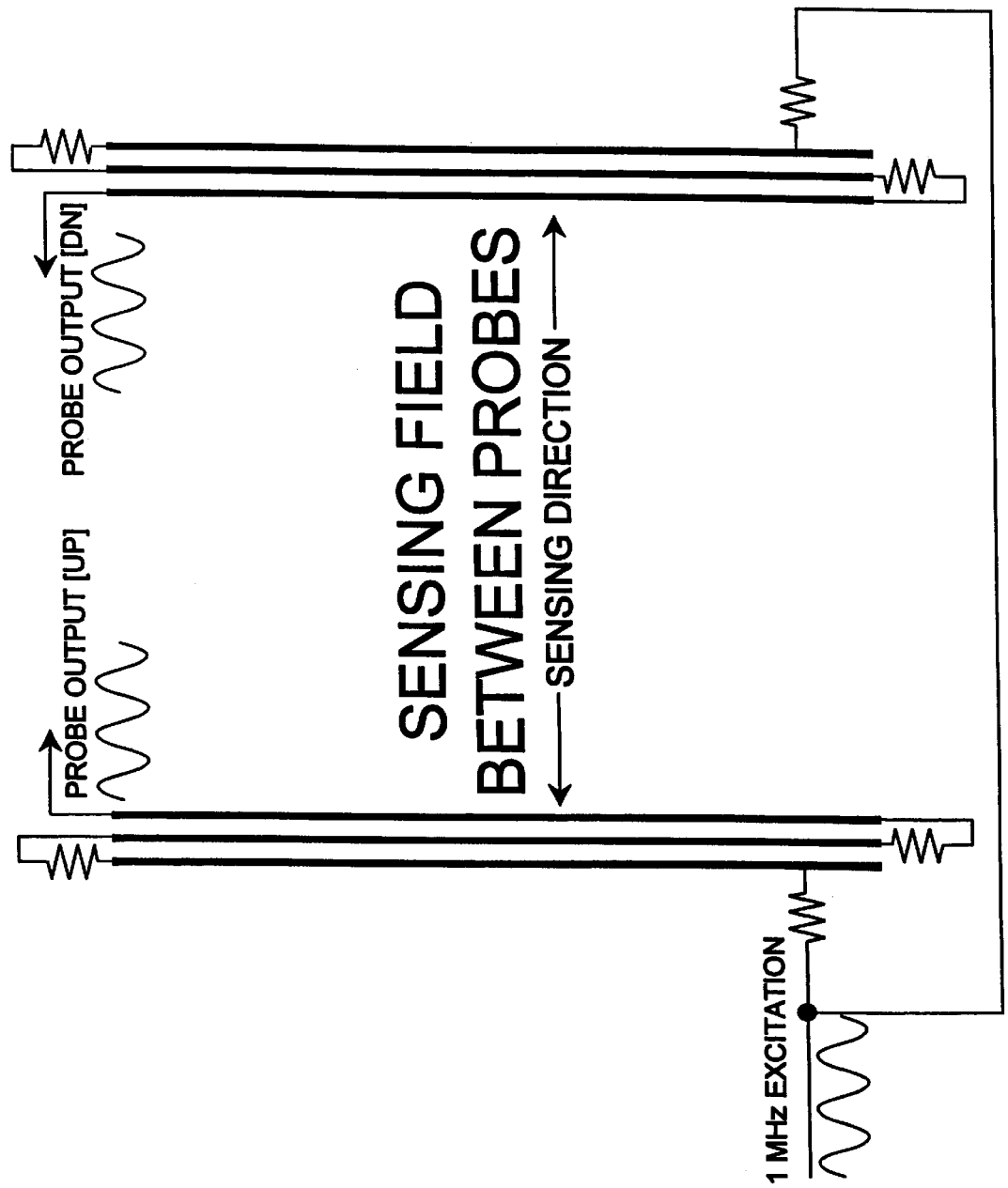
FIG. 5 is a diagram of a pairwise arrangement of sensor probes, which may be employed for measuring position and motion in one direction in the region between the probes.

FIG. 5 depicts a probe pair, representative of one axis of a Probe Array, (Block 2 of FIG. 1). Each probe in the preferred embodiment comprises parallel conducting elements, strips of foil or lengths of wire, interconnected with resistors as shown in the figure. Variations in body capacitance detected within the field (vicinity) of the probes cause corresponding shifts of the phase of the 1 MHz signal applied to each probe circuit.

A single probe can be used to establish a single sensing axis as will be described below. However, the opposing, pairwise arrangement described in the preferred embodiment provides optimum sensitivity and linearity within the sensing region between the two probes.

Figure 6:
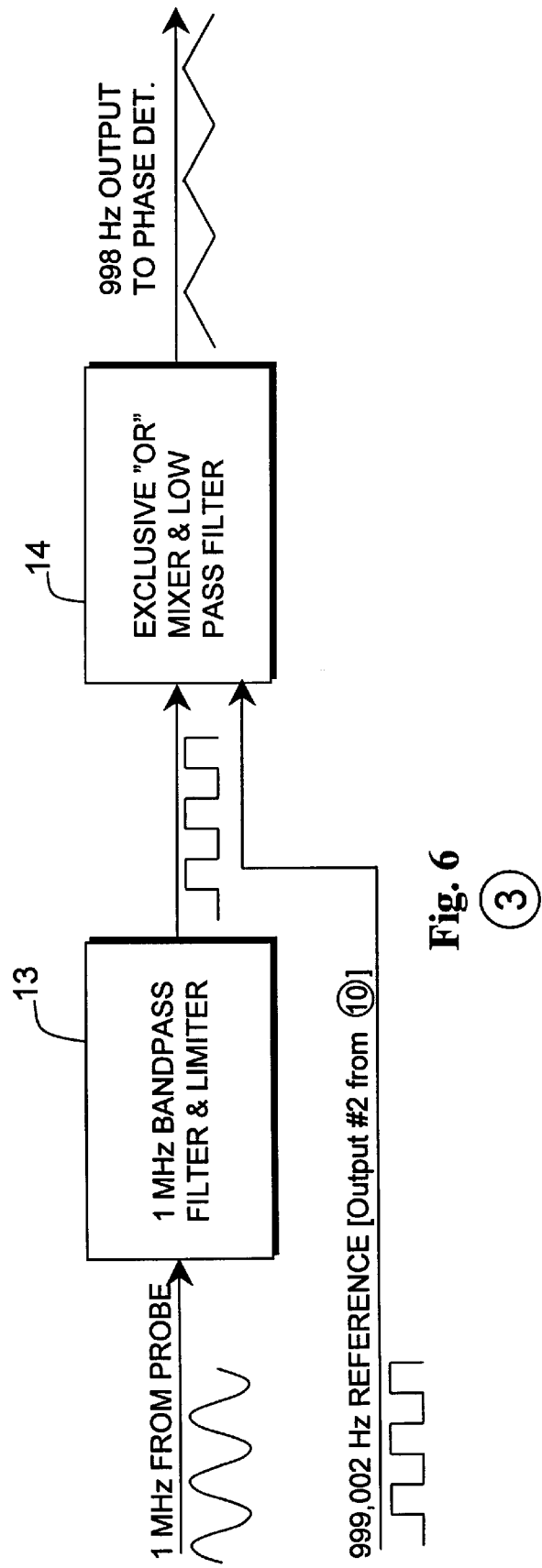
FIG. 6 is a block diagram of an INPUT FILTER, MIXER & LPF shown in FIG. 1.
Figure 7:
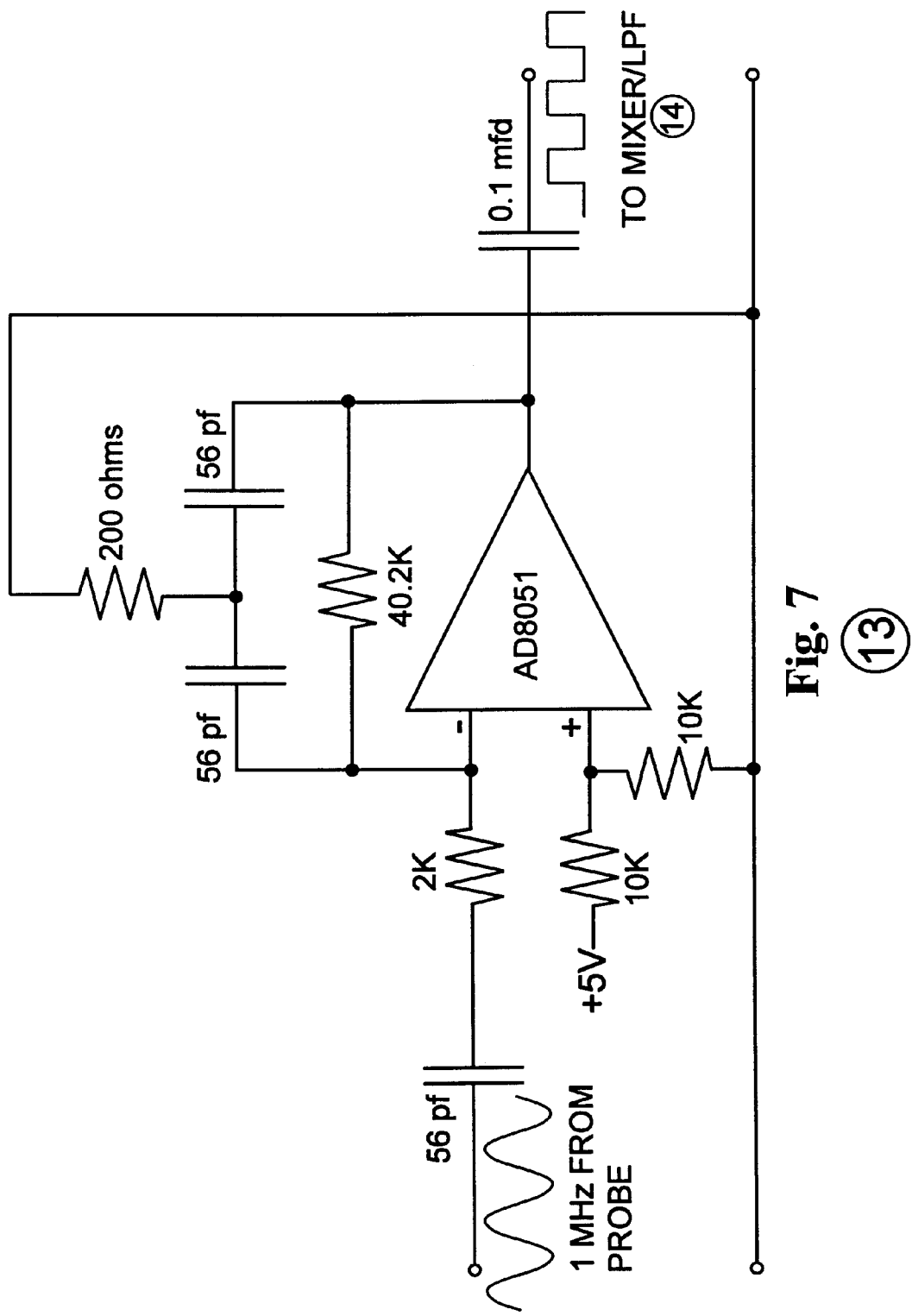
FIG. 7 is a schematic diagram of a 1 MHz BANDPASS FILTER & LIMITER shown in FIG. 6.
Figure 8:
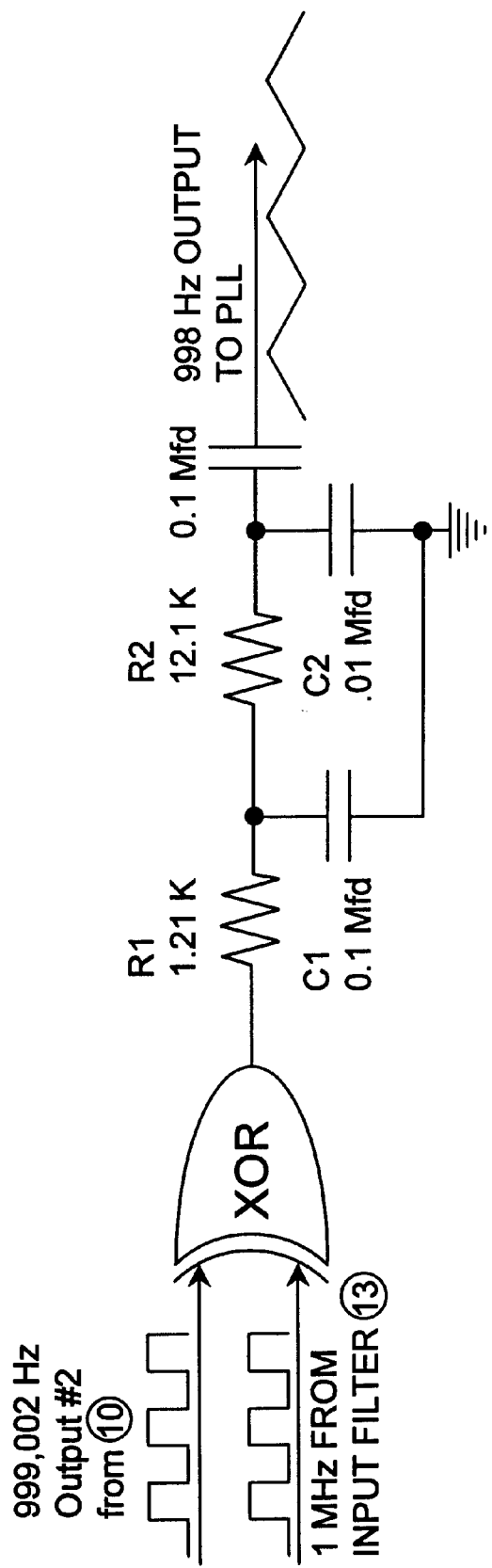
FIG. 8 is a schematic diagram of an EXCLUSIVE "OR" MIXER AND LOW PASS FILTER shown in FIG. 6.

FIG. 6 is a block diagram of the Input Filter, Mixer and LPF (low-pass filter), six of which comprise Block 4 in FIG. 1. Each sinusoidal probe signal is first applied to an active bandpass filter and limiter 13, shown in schematic form in FIG. 7, with sufficient gain to assure rail-to-rail swing (clipping) of the filter output. The filter output and 999,002 Hz reference (Output #2 of the Frequency Reference) are then applied to an Exclusive OR/Low Pass Filter combination 14 (shown in detail in FIG. 8) to obtain the 998 Hz difference frequency between the two signals. The difference frequency (intermediate frequency) is orders of magnitude smaller than the frequency of either signal applied to the Exclusive OR/Low Pass Filter combination 14. The Low-Pass Filter output is an approximate triangle wave as shown.

The mixing process described above preserves the phase shift in degrees of the 1 MHz probe signal with respect to the probe excitation signal. Hence, an 18 degree phase shift in the 1 MHz probe signal, equivalent to a 50 nanosecond shift in the zero crossing at 1 MHz, becomes a 50 microsecond shift in the zero crossing of the 998 Hz signal. [On the other hand, if a 1 MHz signal were converted to 1 kHz by applying it to a divide-by-1,000 circuit, an 18 degree phase variation would also be divided by-1,000, and the 50 nanosecond difference in zero crossings at 1 MHz would still be 50 nanoseconds at 1 kHz.]

Figure 9:
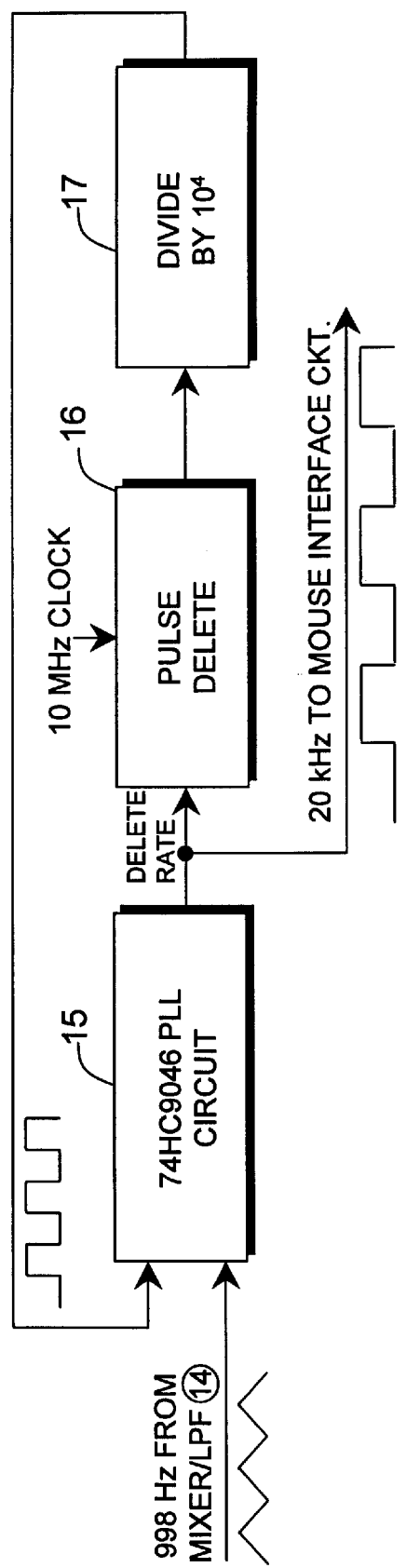
FIG. 9 is a block diagram of one of six identical PHASELOCKED LOOPS shown in FIG. 1 and of an individual PHASELOCKED LOOP shown in FIG. 17 and FIG. 18.

FIG. 9 is a block diagram of a phaselocked loop circuit, six of which comprise Block 4 of FIG. 1, the Phaselocked Loops. Each of these tracking loops is used to track one of the six 998 Hz Mixer outputs and to provide VCO outputs at a nominal frequency of 20 kHz (more accurately, 19,960.08 Hz).

Figure 10:
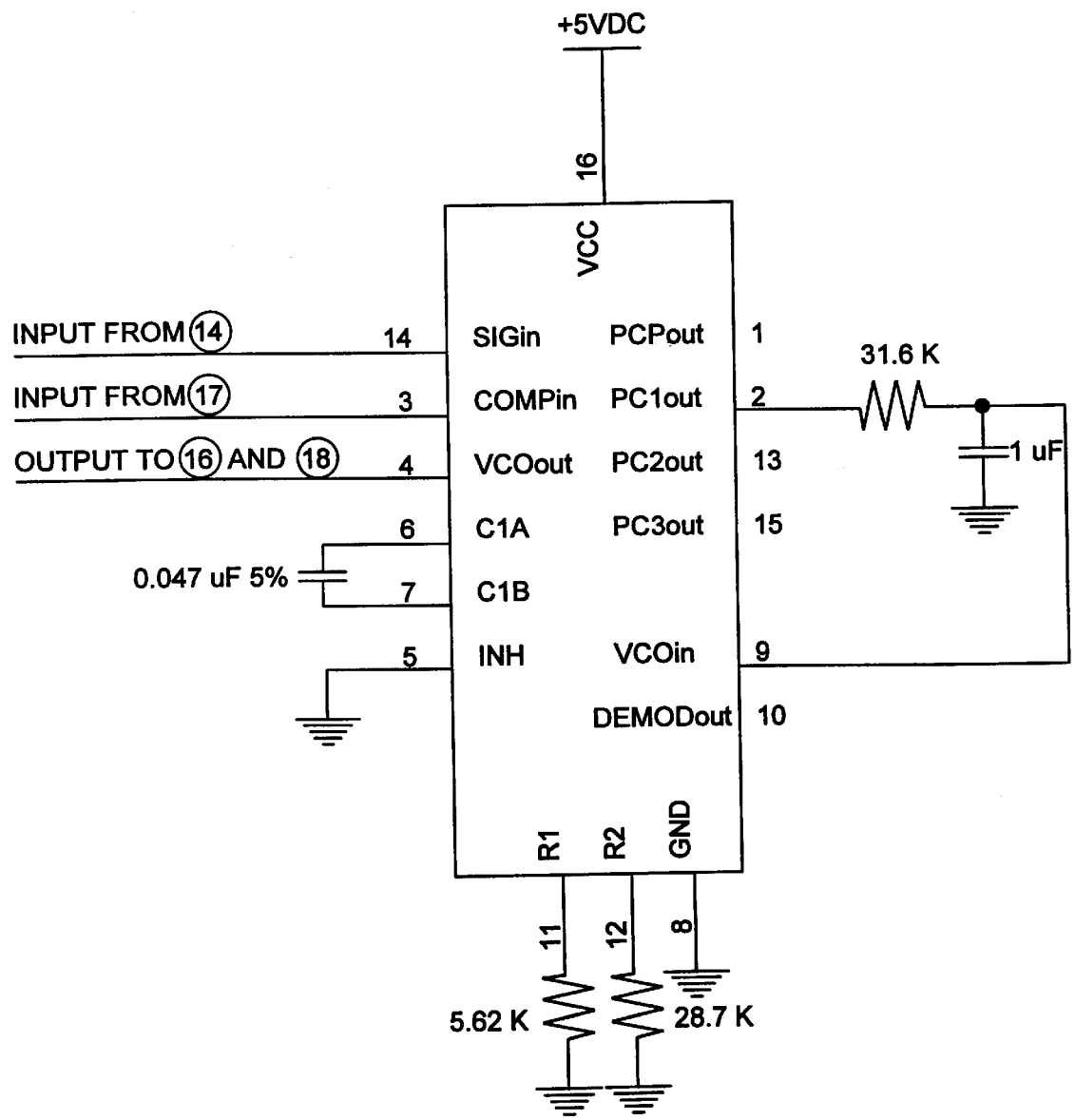
FIG. 10 is a schematic diagram of a 74HC9046 PLL CIRCUIT shown in FIG. 9.

Referring to FIG. 10, the 998 Hz mixer output is applied to the "Signal" input (Pin 14) of a 74HC9046 Phaselocked Loop (PLL) integrated circuit. Phase Comparator #1 of the 9046 (Pin 2) provides an output voltage equal to Vcc/2 times the phase difference in radians between the signal and comparator inputs at Pins 14 and 3, respectively. For Vcc =5 volts, the phase detector output is equal to 1.59 volts per radian (27.8 mv./degree). The Phase Comparator output (Pin 2) is then applied to a single-pole, passive (RC) loop compensation filter as shown in FIG. 10, the output of which is applied to Pin 9, VCO control input, of the 9046.

The external resistor connected to Pin 11 and the capacitor connected between Pins 6 and 7 together determine the center frequency (20 kHz) and scale factor (approximately 8 kHz per volt) of the VCO. The external resistor connected to Pin 12 is used to provide an offset center frequency for the VCO.

The VCO output, at a nominal frequency of 20 kHz, is applied to the "delete rate" input of a Pulse Delete circuit 16 shown in FIG. 9. This circuit is identical to the one described earlier and depicted in FIG. 3. Pulses are deleted from the 10 MHz Reference input at the delete rate of 20 kHz. A divide-by-10,000 circuit 17 of conventional design follows the pulse delete circuit. Both the Pulse Delete and Divide-by-10,000 functions are implemented with logic contained within the previously mentioned programmable logic device.

The output of the Divide-by 10,000 is a 998 Hz [(10,000, 000−20,000)/10,000] signal with a jitter of ±0.018° at a jitter frequency of 998 Hz. This signal is applied to the Comparator input (Pin 3) of the 74HC9046 PLL to complete the tracking loop.

Component values in the tracking loop are selected using conventional phaselocked loop design methods. In the preferred embodiment, the loop is designed to provide a critically damped response with roots at −16 radians/second.

As previously noted, since the 1 MHz probe signals are heterodyned with the 999,002 Hz reference signal (FIG. 6) to derive each of the 998 Hz inputs to the phaselocked loops, the phase shift in degrees of the 1 MHz probe inputs is preserved in the 998 Hz Mixer outputs. Each tracking loop VCO [with a nominal center frequency of 20 kHz] is phaselocked to one of the probe input signals. As a result of the Divide-by-10,000 in the loop, phase variations in the 998 Hz input to the tracking loop are multiplied by 10,000 in the VCO output signal, i.e., an increase of orders of magnitude. A phase shift of one cycle (360 degrees) in the VCO output represents 360/10,000=0.0360° of relative phase change between a pair of 1 MHz probe signals. At the 1 MHz probe frequency, this corresponds to an increment of 0.1 nanosecond. However at the 998 Hz phase detector input, the corresponding time increment is equal to 0.1 microsecond or 100 nanoseconds. At the 20 kHz VCO output, the same increment of phase change corresponds to one cycle at 20 kHz, or 50 microseconds (50,000 nanoseconds).

The 20 kHz outputs of the phaselocked loops are the primary or "primitive" outputs of the invention. Relative phase changes between signals derived from any pair of probes are obtained by counting cycle "slips" between the corresponding pair of VCO outputs.

The frequency of the "20 kHz" VCO signals, referenced to a clock oscillator frequency of 10 MHz, is exactly 10,000,000/501 Hz. This frequency is exactly equal to the frequency of Output #1 from the Frequency Reference. Hence, the position and motion of a hand or other object relative to a single probe can be measured by counting cycle slips of the probe-derived 20 kHz VCO with respect to Output #1 from the Frequency Reference. Examples of applications requiring the measurement of position relative to a single sensor would include intrusion detection and protection of an operator using a dangerous machine.

Figure 11:
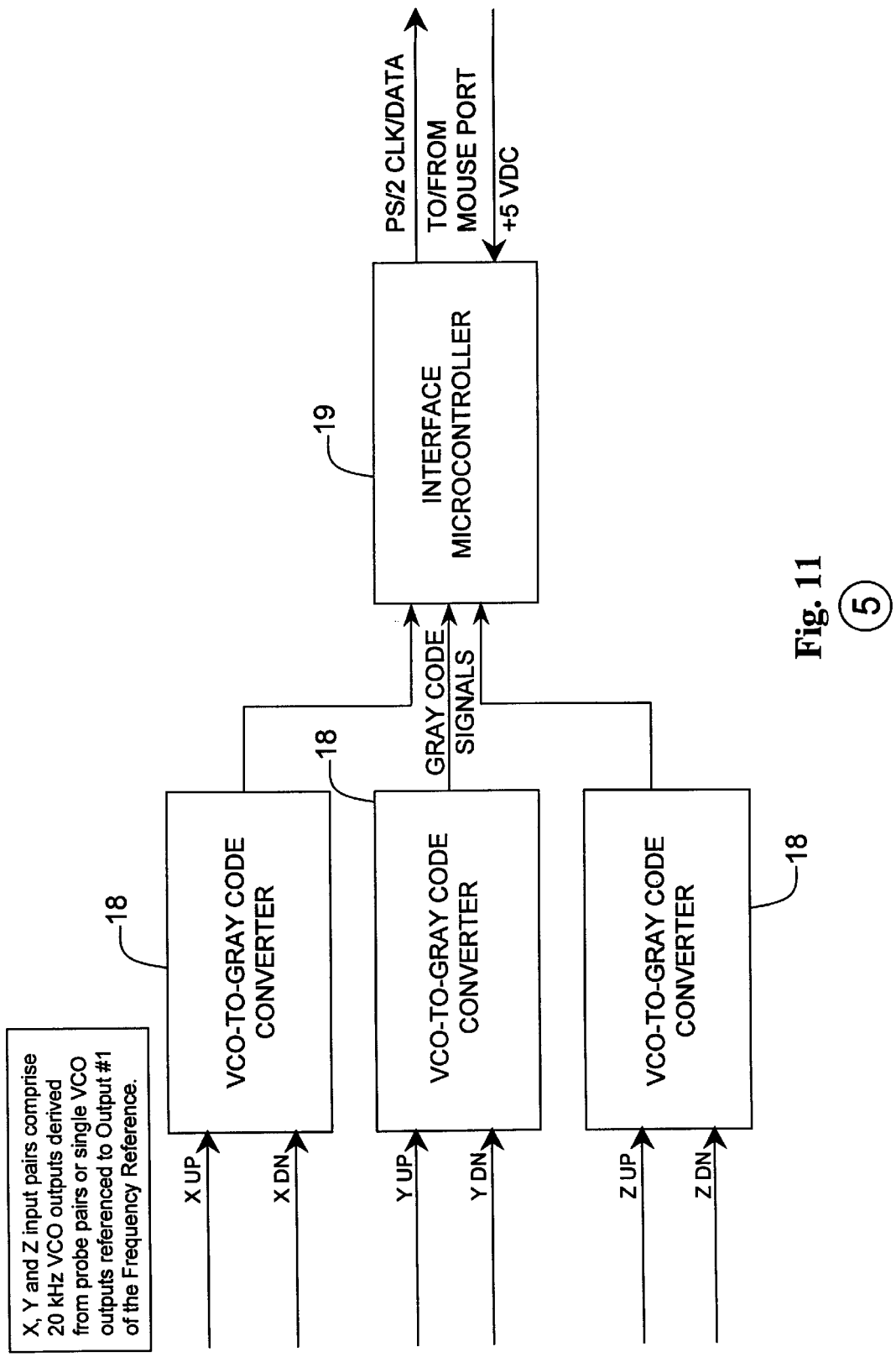
FIG. 11 is a block diagram of INTERFACE ELECTRONICS shown in FIG. 1.

FIG. 11 is a block diagram of a typical embodiment of the Interface Electronics, Block 5 in FIG. 1. In the preferred embodiment, pairs of 20 kHz signals are converted to Gray Code format by converters 18 to interface directly with a commercial mouse controller IC 19.

Figure 12:
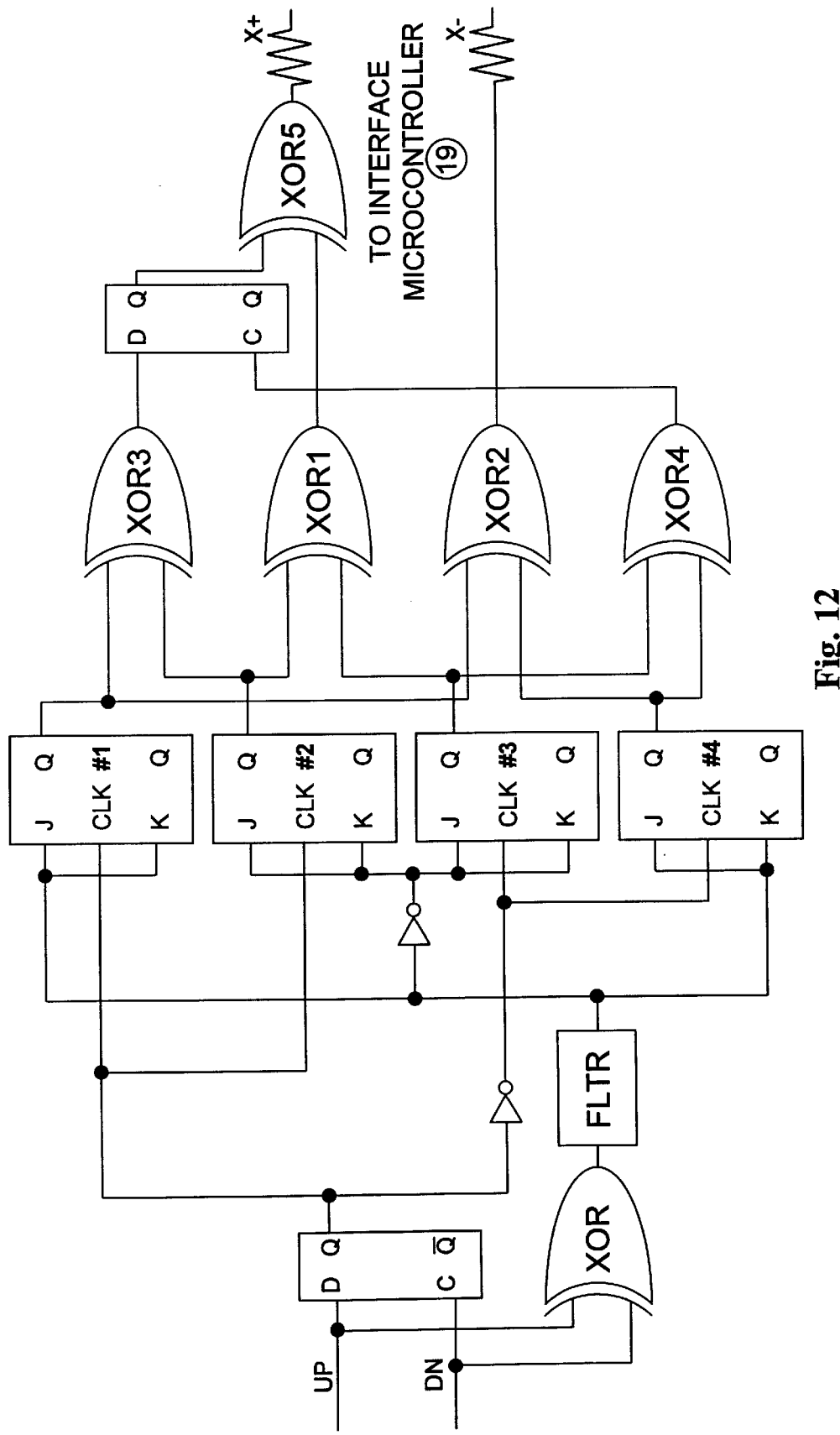
FIG. 12 is a diagram, partly in block form and partly in schematic, of a VCO-TO-GRAY CODE CONVERTER shown in FIG. 11.

FIG. 12 shows the detailed logic design of the VCO-to-Gray Code Converter 18. The two 20 kHz signals comprising a single axis UP/DOWN pair are applied to a D flip-flop. The Q output of the D flip-flop will change state for each 180 degrees of relative phase shift between the two input signals. The two 20 kHz signals are also applied to a two-input Exclusive OR (XOR) gate. A low-pass filter follows the XOR. Either a two-pole passive RC filter or digital filter of known design can serve this purpose. The sign of the filtered output of the XOR determines the direction (UP or DOWN) of the desired count.

Both positive-going and negative-going transitions of the Q output of the D flip-flop produce counts. This provides a resolution of one count for each 180 degrees of phase shift between the two VCO inputs, corresponding to phase changes in the 1 MHz probe signals of 0.018 degrees. The remaining logic shown in FIG. 12 is used to convert the Q and filtered XOR outputs to gray code format.

Figure 13:
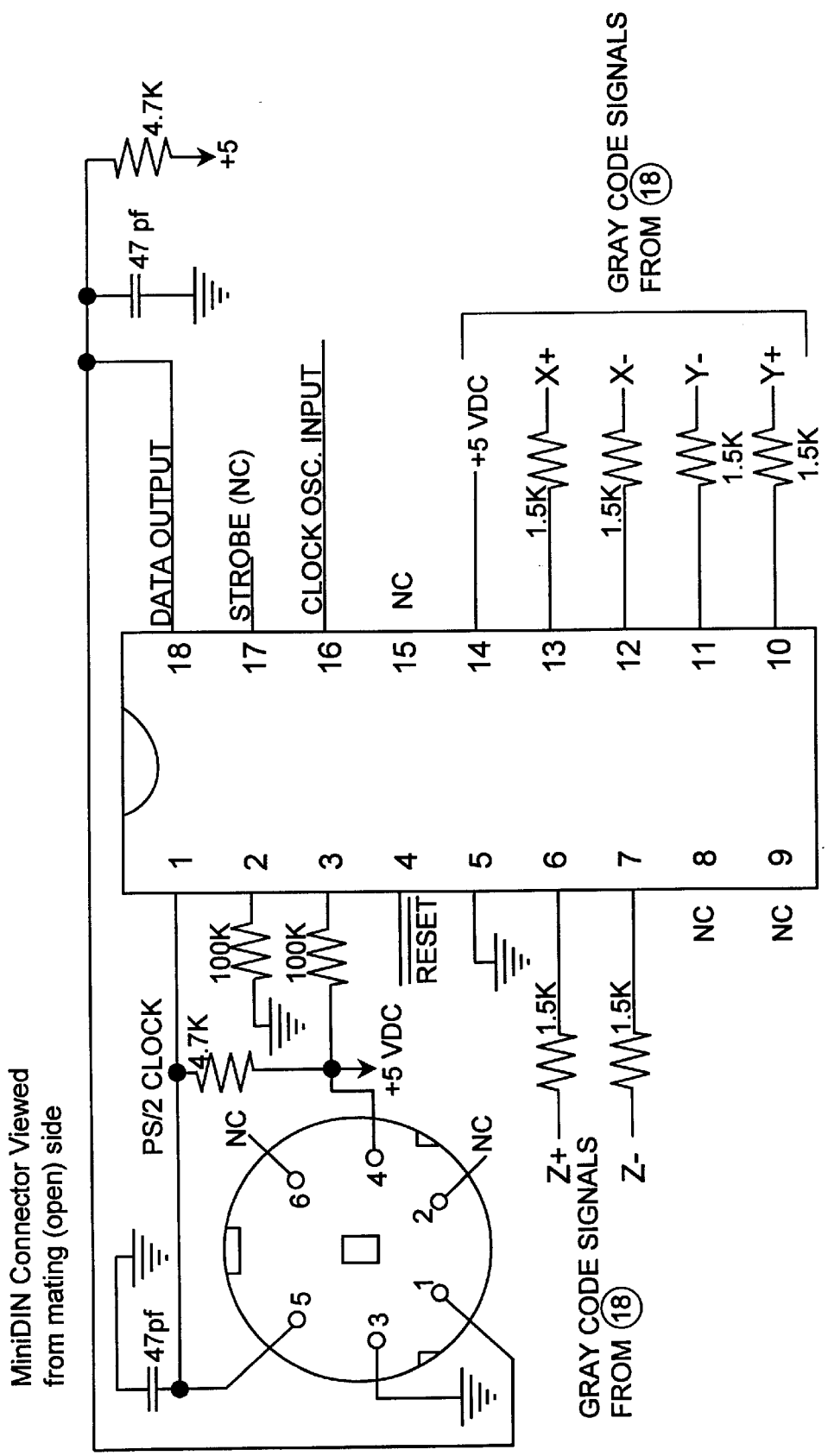
FIG. 13 is a schematic diagram of an INTERFACE MICROCONTROLLER shown in FIG. 11.

FIG. 13 is a schematic representation of the Interface Microcontroller 19 used to convert the outputs of the gray code converter 18 to PS/2 or serial mouse format.

The embodiment of Block 5, Interface Electronics, described above, illustrates just one possible circuit arrangement for converting pairwise combinations of 20 kHz signals into a format suitable for a specific application of the invention. Alternative circuits for counting the cycle slip between two signals are well known to those skilled in the art.

Figure 14:
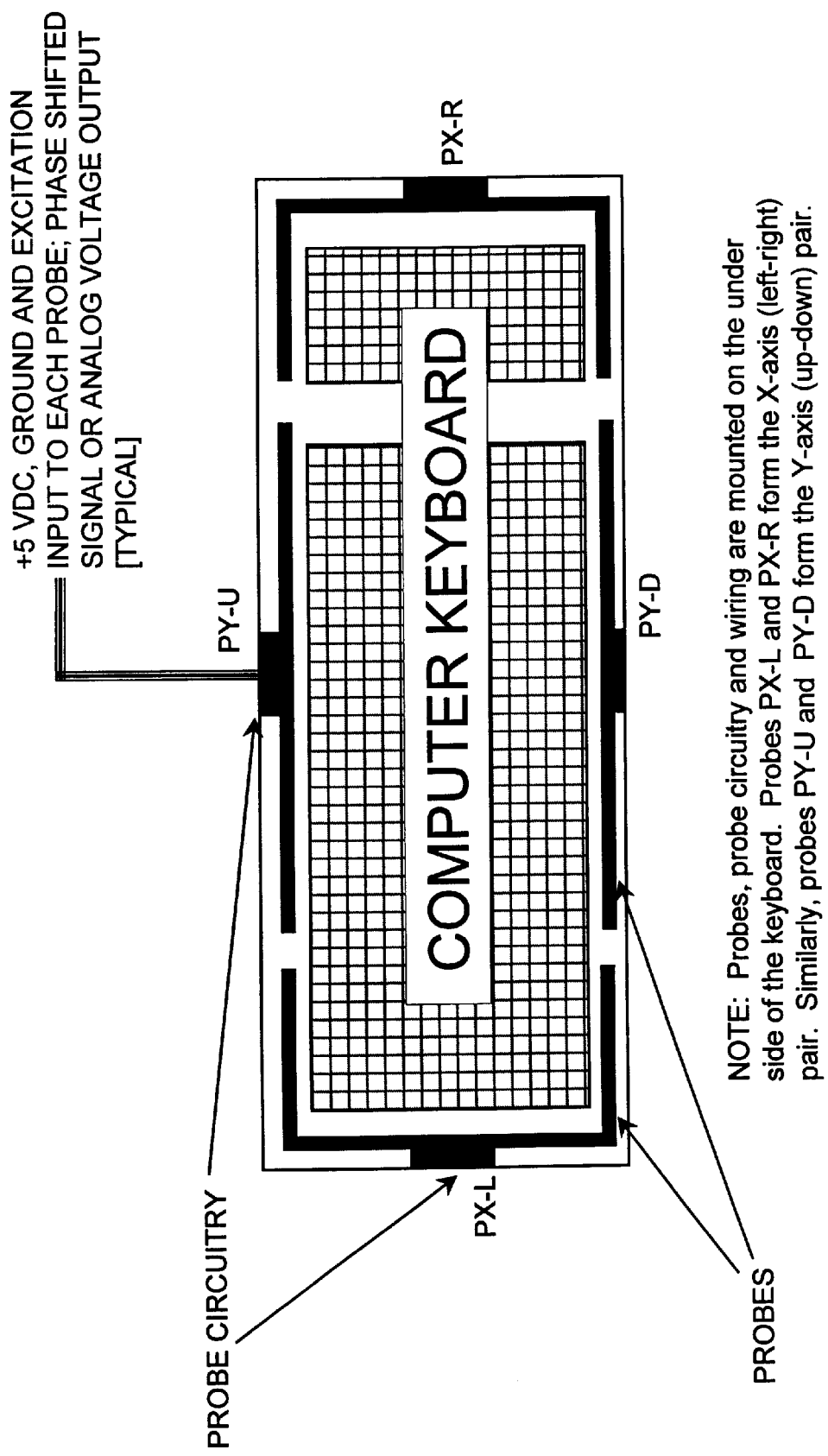
FIG. 14 is a diagram of a two-dimensional sensor array configuration incorporated in a desktop computer keyboard.
Figure 15:
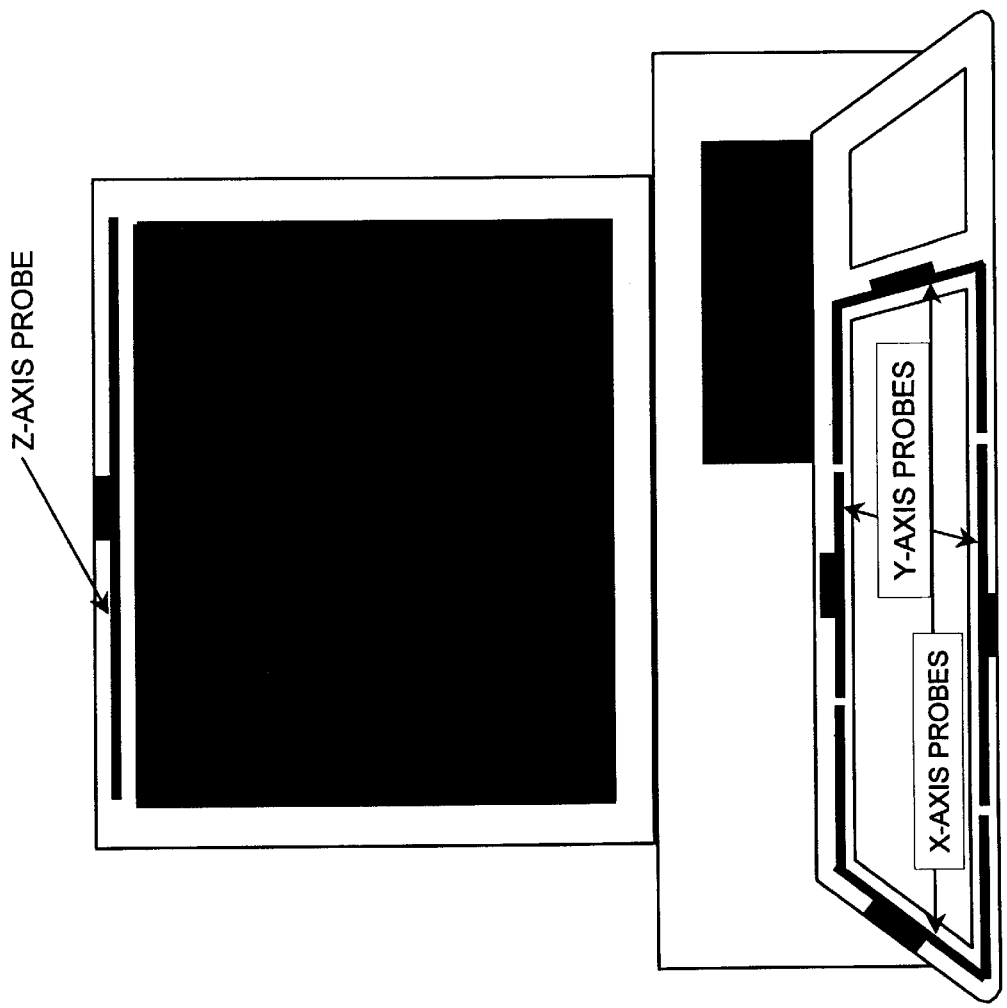
FIG. 15 is a diagram of a three-dimensional sensor array configuration incorporated in a desktop computer and monitor.
Figure 16:
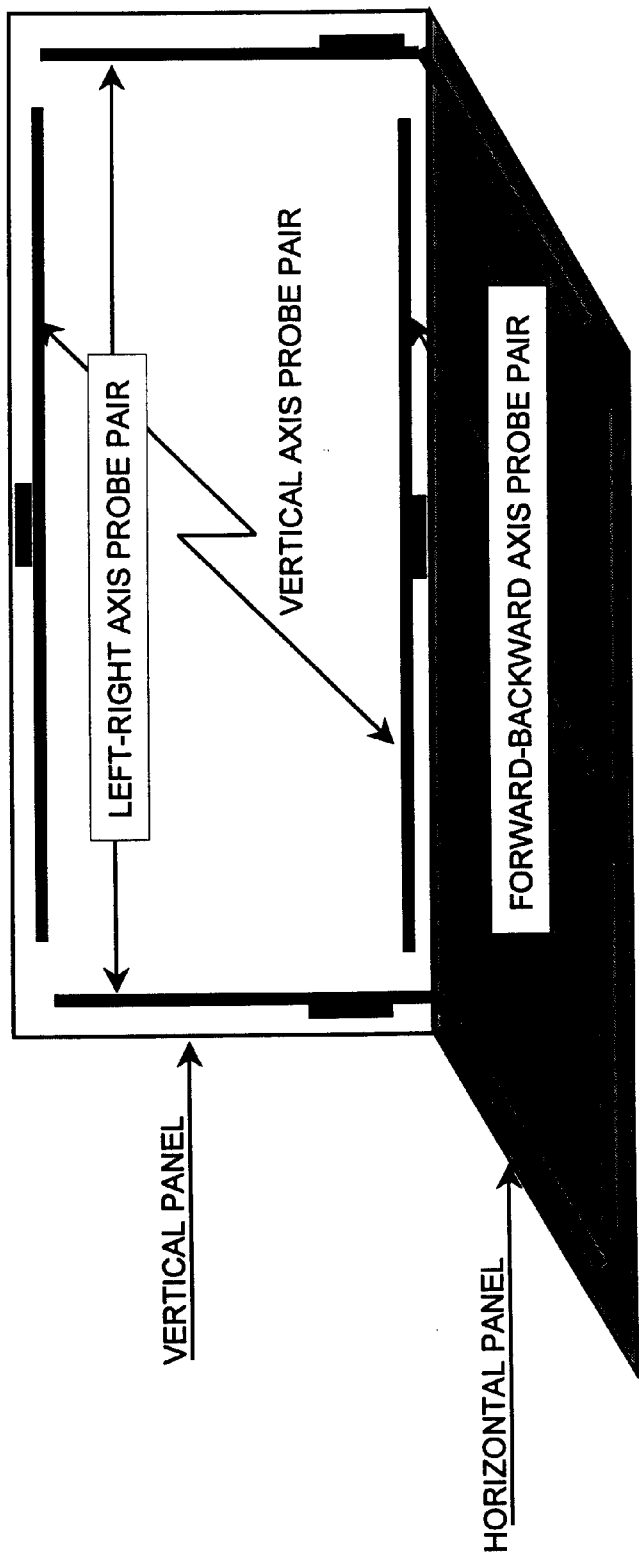
FIG. 16 is a diagram of a 3D sensor array configuration in the form of two panels at right angles.

Three examples of probe geometry are illustrated in FIG. 14, FIG. 15 and FIG. 16. The probes will typically comprise lengths of wire or narrow strips of metallic foil mounted, in the case of FIG. 14, on the under side of a computer keyboard.

FIG. 14 depicts a two-dimensional probe geometry useful for emulating the functions of a conventional mouse. The pairwise arrangement of the probes provides symmetry within the region of sensitivity. A similar arrangement can serve the same purpose on a laptop computer.

FIG. 15 shows a probe configuration that can be used to provide three-dimensional inputs to a desktop computer. In this example, the pairwise arrangement is retained in the X and Y axes, and a single probe, mounted at the top of the monitor, is compared with one of the Y-axis probes to establish the Z axis.

FIG. 16 shows a probe arrangement on two panels at right angles to each other. This produces a three-dimensional control region which, for example, can be used to control the motion of a wheelchair.

Clearly, an unlimited number of probe arrangements are possible, including helmet-mounted probes, multiple panels employed to detect the presence of a person in dangerous proximity to a piece of machinery, and an endless variety of other applications.

Figure 17:
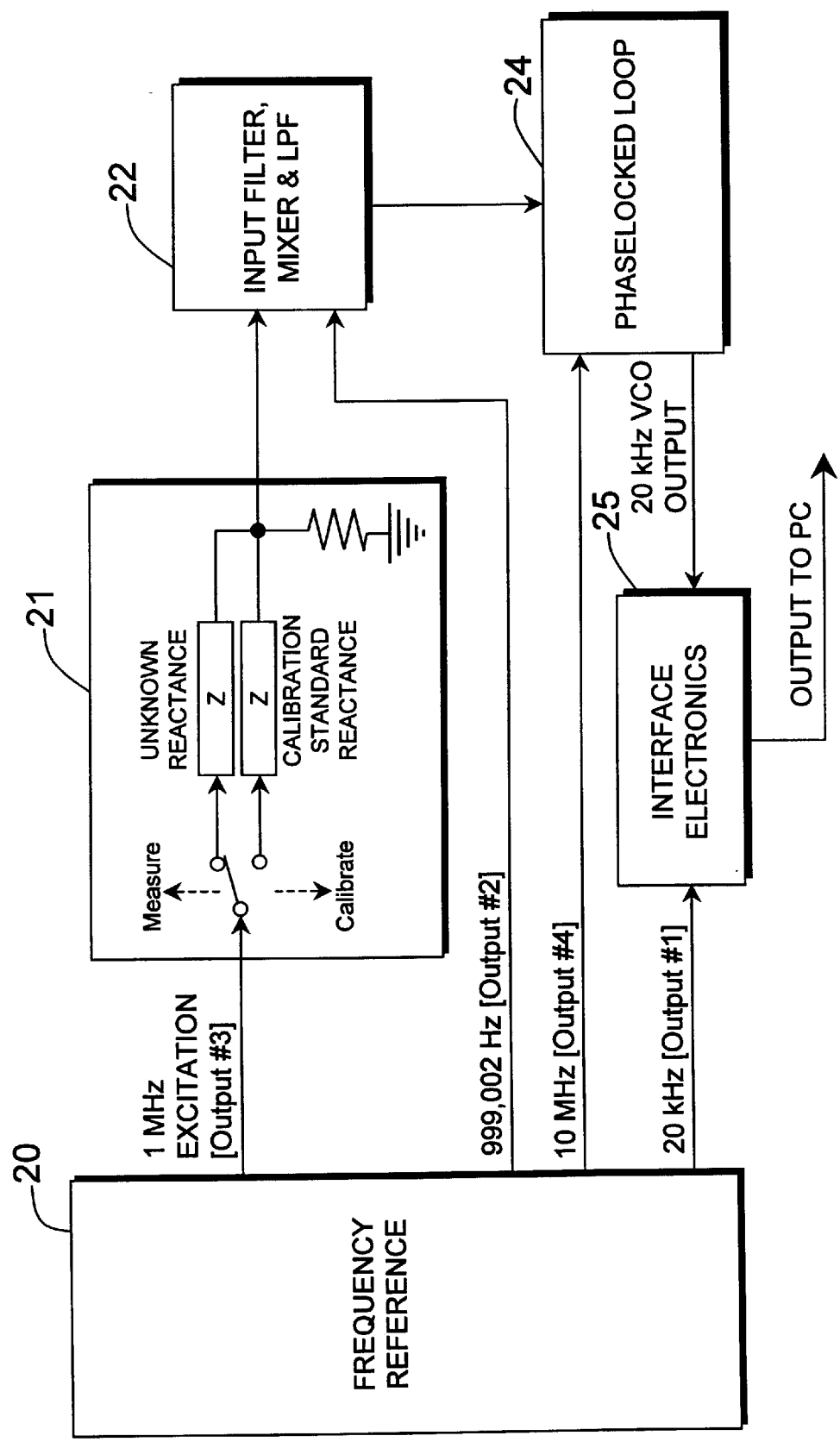
FIG. 17 is a diagram, partly in block form and partly in schematic, of an apparatus for high-resolution measurement of an unknown capacitance or inductance in accordance with the invention.

FIG. 17 shows an embodiment for direct measurement of an unknown capacitance or inductance. In this case, the 1 MHz Excitation [Output #3] is applied to the series combination of the unknown reactance (capacitance or inductance) and a fixed resistor of known value. The phase of the signal at the junction between the two components is measured as in the earlier described embodiment of the invention. Calibration is achieved by substituting one or more known reactance in the circuit as shown in the figure.

Figure 18:
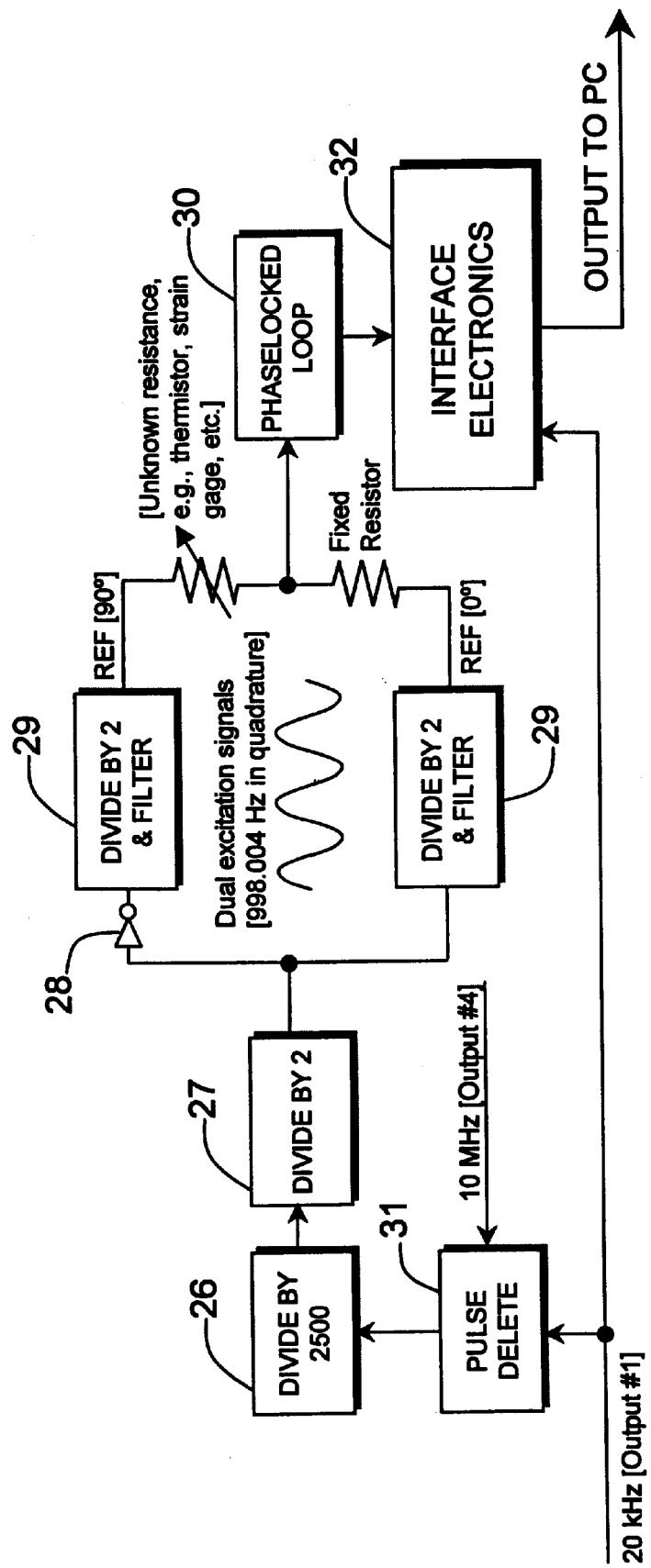
FIG. 18 is a diagram, partly in block form and partly in schematic, of an apparatus for high-resolution measurement of an unknown resistance in accordance with the invention.

FIG. 18 shows an embodiment of the invention providing a high-resolution, direct digital measurement of resistance, and thereby providing accurate digital measurement of any physical phenomenon that can be related to resistance, as in the use of thermistors for temperature measurement or strain gages, for example.

Referring to FIG. 18, Output #1 (19,960.08 Hz) is applied to the delete rate input of a pulse delete circuit (shown in FIG. 3), together with the 10 MHz Clock Signal. The output of the pulse delete is applied to a divide-by-2500 to obtain a signal at 3,992.016 Hz. This signal is then applied to a divide-by-2, providing an output at 1,996.008 Hz with a precise 50:50 duty cycle. This signal is then applied directly to a divide-by-2 circuit 29, and, via inverter 28, to a second divide by 2. This produces two 998.004 Hz outputs in exact phase quadrature (90° out of phase).

The two 998.004 Hz signals are applied across a series combination comprising the resistance to be measured and a reference resistor of known value. The junction of the two resistors is connected to the input terminal of the op amp input of the phaselocked loop 30. The resulting signal at the input to the phaselocked loop will exhibit a phase shift relative to the in-phase 998.004 Hz signal equal to the arctangent of the ratio of the unknown resistor to the known reference resistor. This nonlinearly can be readily compensated within the using computer.

Output #1 and the VCO output of the phaselocked loop (nominally 20 kHz) are applied to Interface Electronics 32, which includes a counter of conventional design that accumulates cycle slips between the two signals and circuitry that formats the resulting measurement data for input to a PC or dedicated microcomputer.

The embodiment described above can be employed to measure resistance values with an accuracy of 0.1 percent or better. As in the earlier described embodiments, phase changes in an output signal correspond to substantially smaller phase changes in an input signal, and the phase changes in the output signal are preferably at least an order of magnitude greater than the corresponding phase changes in the input signal.

While preferred embodiments of the invention have been shown and described, the embodiments are to be considered exemplary rather than restrictive, and various modifications can be made without departing from the principles and spirit of the invention, the scope of which is defined in the appended claims.

What is claimed is:

1. Measurement apparatus comprising:
    means for providing first and second signals of constant frequency and phase;
    means for producing a phase shift in said first signal proportional to a phenomenon, property, or condition to be measured;
    means for combining said phase-shifted first signal with said second signal to extract a third signal at a difference-frequency between the first and second signals; and
    phaselocked loop means for producing an output signal phaselocked to said third signal, wherein phase changes in said third signal produce phase changes in said phaselocked loop output signal that are substantially greater than corresponding phase changes in said third signal.

2. Apparatus as set forth in claim 1, wherein the frequency difference between said first and second signals is orders of magnitude smaller than the frequency of either signal.

3. Apparatus as set forth in claim 1, wherein said first and second signals are both derived from the same constant frequency reference source.

4. Apparatus as set forth in claim 3, wherein said means for providing first and second signals includes at least one frequency divider and a pulse deletion circuit that deletes pulses from said constant-frequency reference source.

5. Apparatus as set forth in claim 1, wherein said means for combining said first and second signals to extract said third signal comprises an exclusive OR circuit followed by a low-pass filter.

6. Apparatus as set forth in claim 1, further comprising phase measurement means for measuring the relative phase of said output signal and a constant-frequency reference signal.

7. Apparatus as set forth in claim 6, wherein said phase measurement means comprises up/down counting means responsive to full cycle phase variations between said output signal and said reference signal.

8. Apparatus as set forth in claim 6, wherein said phase measurement means comprises up/down counting means responsive to fractional cycle phase variations between said output signal and said reference signal.

9. Apparatus as set forth in claim 6, wherein said phenomenon to be measured is the presence of a hand or other object that introduces a capacitance into a sensor field to produce said phase shift.

10. Apparatus as set forth in claim 9, wherein the relative phase provides a measure of the distance from said hand or other object to a sensor.

11. Apparatus as set forth in claim 10, wherein a plurality of said first signals are provided, said phase shift producing means produces phase shifts in corresponding first signals, said combining means combines each phase-shifted first signal with said second signal to extract a corresponding third signal, and said phaselocked loop means produces a plurality of output signals phaselocked to corresponding third signals, and wherein said sensor is one of a plurality of sensors and each sensor is part of the means for producing a phase shift in the corresponding first signal.

12. Apparatus as set forth in claim 11, wherein an accurate measure of the position and motion of said hand or other object in a space between a pair of said sensors is obtained by measuring the relative phase of corresponding phase-locked loop output signals.

13. Apparatus as set forth in claim 12, wherein a plurality of pairs of said output signals establish an accurate measure of the position and motion of said hand or other object in a three-dimensional sensor field.

14. Apparatus as set forth in claim 11, wherein said sensors are arranged on panels.

15. A measurement method in which a phenomenon, property, or condition to be measured produces phase changes in a fixed-frequency reference signal to produce a phase-shifted reference signal, and in which the phase-shifted reference signal is employed to produce corresponding, but substantially greater phase changes in another signal, that produces an output.

16. A method according to claim 15, wherein the phase-shifted reference signal is mixed with a second reference signal to obtain an intermediate signal for use in producing the phase changes in the other signal.

17. A method according to claim 16, wherein a phase-locked loop is used to multiply the phase changes in the intermediate signal.

18. A method according to claim 15, wherein the phase changes in the fixed-frequency reference signal are due to the presence of an object in a sensor field.

19. A method according to claim 18, wherein the sensor field is provided by at least one sensor.

20. A method according to claim 18, wherein the sensor field is provided by an array of sensors.

21. A method according to claim 20, wherein the array is three-dimensional.

22. A method according to claim 18, wherein the output represents at least one of the position and movement of the object in the sensor field.

23. Apparatus for measuring a phenomenon, property, or condition that produces minute phase shifts in a fixed-frequency reference signal, comprising:

a system that uses the phase-shifted reference signal to produce a further signal in which the phase shifts of the phase-shifted reference signal are multiplied to a different order of magnitude and that produces an output from the further signal.

24. Apparatus according to claim 23, wherein the system includes a device that produces an intermediate signal of lower frequency than the fixed frequency reference signal and that contains phase information corresponding to the phase shifts of the reference signal, and a device that produces a signal of higher frequency than said intermediate signal and that contains phase information corresponding to the phase information of the intermediate signal.

25. Apparatus according to claim 24, wherein the device that produces the intermediate signal includes a mixer that mixes the phase shifted reference signal with a second reference signal, and the device that produces the signal of higher frequency than the intermediate signal comprises a phaselocked loop.

* * * * *

UNITED STATES PATENT AND TRADEMARK OFFICE
CERTIFICATE OF CORRECTION

PATENT NO.   : 6,373,235 B1
DATED        : April 16, 2002
INVENTOR(S)  : A. Clifford Barker It is certified that error appears in the above-identified patent and that said Letters Patent is hereby corrected as shown below:

<u>Title page,</u>
Item [76], Inventor's name and address should read:

-- A. Clifford Barker, 1520 S. Delaware Pl.,
   Tulsa, OK (US) 74104 --

Signed and Sealed this

Fourteenth Day of January, 2003

JAMES E. ROGAN
*Director of the United States Patent and Trademark Office*